(12) United States Patent
Sumida et al.

(10) Patent No.: US 8,408,814 B2
(45) Date of Patent: Apr. 2, 2013

(54) OPTICAL CONNECTOR

(75) Inventors: Koji Sumida, Sakura (JP); Kazuhiro Takizawa, Sakura (JP); Daigo Saito, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/207,136

(22) Filed: Aug. 10, 2011

(65) Prior Publication Data

US 2011/0293222 A1 Dec. 1, 2011

Related U.S. Application Data

(63) Continuation of application No. PCT/JP2009/007022, filed on Dec. 18, 2009.

(30) Foreign Application Priority Data

| Feb. 12, 2009 | (JP) | 2009-030208 |
| Feb. 12, 2009 | (JP) | 2009-030328 |
| Feb. 12, 2009 | (JP) | 2009-030329 |

(51) Int. Cl.
*G02B 6/36* (2006.01)
*G02B 6/255* (2006.01)

(52) U.S. Cl. ............ 385/83; 385/60; 385/61; 385/65; 385/75; 385/76; 385/77; 385/78; 385/81; 385/85; 385/86; 385/87; 385/95; 385/97; 385/98

(58) Field of Classification Search ............ 385/61, 385/65, 81, 83, 85, 87, 98
See application file for complete search history.

(56) References Cited

U.S. PATENT DOCUMENTS

| 5,062,684 A * | 11/1991 | Clayton et al. ............ 385/27 |
| 7,014,372 B2 * | 3/2006 | Watte et al. ............ 385/98 |
| 2005/0117851 A1 | 6/2005 | Takeda et al. |
| 2007/0086707 A1 | 4/2007 | Suzuki et al. |
| 2007/0104425 A1 * | 5/2007 | Larson et al. ............ 385/86 |
| 2007/0196053 A1 * | 8/2007 | Kewitsch ............ 385/74 |
| 2009/0317074 A1 * | 12/2009 | Tan et al. ............ 398/20 |

FOREIGN PATENT DOCUMENTS

| CN | 1882861 A | 12/2006 |
| JP | 63-179304 A | 7/1988 |
| JP | 5-100117 A | 4/1993 |
| JP | 5-181040 A | 7/1993 |
| JP | 6-174971 A | 6/1994 |

(Continued)

OTHER PUBLICATIONS

International Search Report for PCT/JP2009/007022 dated Feb. 9, 2010.

(Continued)

*Primary Examiner* — Ryan Lepisto
(74) *Attorney, Agent, or Firm* — Sughrue Mion, PLLC

(57) ABSTRACT

An optical connector of the present invention includes a ferrule to which an internal optical fiber is embedded and an end face grinding is performed; and a connection mechanism which extends to an opposite side of a connection end face of the ferrule, wherein the optical connector butt connects the internal optical fiber and an insert optical fiber which is inserted from outside within a positioning groove provided at the connection mechanism; and a back end side of an end face of the internal optical fiber which butts to the insert optical fiber is made a beveled end face by cutting process.

6 Claims, 9 Drawing Sheets

FOREIGN PATENT DOCUMENTS

| | | |
|---|---|---|
| JP | 8-201652 A | 8/1996 |
| JP | 9-243838 A | 9/1997 |
| JP | 11-218634 A | 8/1999 |
| JP | 2001-13354 A | 1/2001 |
| JP | 2004-258191 A | 9/2004 |
| JP | 2005-157129 A | 6/2005 |
| JP | 2005-274839 A | 10/2005 |
| JP | 2008-139567 A | 6/2008 |
| WO | 2009/153930 A1 | 12/2009 |

OTHER PUBLICATIONS

Chinese OA for Chinese Application No. 200980156490.1 dated Jan. 5, 2013 with English translation.

* cited by examiner

OPTICAL CONNECTOR

CROSS REFERENCE TO RELATED APPLICATIONS

This application is a continuation application based on a PCT Patent Application No. PCT/JP2009/007022, filed Dec. 18, 2009, whose priorities are claimed on Japanese Patent Application No. 2009-030208 filed Feb. 12, 2009, Japanese Patent Application No. 2009-030328, filed Feb. 12, 2009, and Japanese Patent Application No. 2009-030329, filed Feb. 12, 2009, the entire contents of which are hereby incorporated by reference.

BACKGROUND OF THE INVENTION

1. Field of the Invention

The present invention relates to an optical connector which comprises a ferrule and a connection mechanism which is integrated with the ferrule, in which an internal optical fiber is embedded in the ferrule and end face grinding is performed in the ferrule, and the optical connector butt connects the internal optical fiber and an insert optical fiber within a positioning groove which is provided in the connection mechanism.

2. Description of the Related Art

Generally, an end face grinding of a ferrule is performed in an optical connector in order to reduce connection loss in optical connector connection.

In this case, in order to suppress an optical loss caused by Fresnel reflection, generally, a refraction index adjusting agent is interposed in a gap (space) generated between the ferrule end faces (between optical fiber end faces).

Furthermore, it is common practice that the optical fiber end face be obliquely (bevel) ground by obliquely grinding the ferrule end face, such that the Fresnel reflection is eliminated as much as possible.

Furthermore, the following method is performed, in which the optical fiber end face is spherically ground by spherically grinding the ferrule end face, such that a physical contact (PC connection) in which the optical fiber end faces are directly contacted to each other without a gap.

Furthermore, as a device for obtaining a large return loss (a device for suppressing a reflection) in an optical connector connection, an optical fiber connector is shown in Patent Document 1 (Optical Connector and Manufacturing Method Thereof; Japanese Unexamined Patent Application, First Publication No. H05-181040 (FIG. 1, claims 1 and 3, Paragraph [0023])), in which a core end face of the optical fiber is formed in a hemispherical shape with a necessary protruded amount, by etching the mutually butting end faces of the optical fibers with a particular etching solution (an etching solution in which the higher the core dopant concentration of the optical fiber, the lower the etching speed).

A large return loss is obtained, since the cores are directly contacted to each other (physical contact) by forming the optical fiber core to a protruded hemispherical shape.

Furthermore, as the same device for obtaining a large return loss in an optical connector connection, an optical connector is shown in Patent Document 2 (Optical Connector; Japanese Unexamined Patent Application, First Publication No. H06-174971 (FIGS. 1 and 3, claims 1 and 2, Paragraphs [0027] and [0028])), in which the optical connector is configured in such a way that the optical fibers are not contacted and detached from each other when the ferrules are contacted without pressing, and the optical fibers are contacted to each other when a pressure is applied. In this case, the gap between the optical fibers when the ferrules are contacted without pressing is set to be within a deformation volume of the ferrule which is determined by the pressure when the ferrule is pressed within the elastic limit of the ferrule. That is, the retract amount d of the optical fiber end face with respect to the ferrule end face is set to an appropriate value which corresponds to the elastic coefficient of the ferrule.

As shown in FIG. 1, in an optical connector 1, a connection mechanism 4 is integrated with a ferrule 3 to which an internal optical fiber 2 is embedded and an end face grinding is performed, and the internal optical fiber 2 and an insert optical fiber 10a inserted from outside is but connected within a positioning groove provided in the connection mechanism 4. The optical connector 1 can be easily assembled without a grinding operation in the field. Therefore, the optical connector 1 is widely used as a field assembly type optical connector.

The connection mechanism 4 includes a base 6 which is integrated with the ferrule 3 and a positioning groove 5a which connects to an optical fiber hole 3a of the ferrule is formed thereon, lids 7, 8 which are disposed opposite to the base 6, and a plate spring 9 which elastically clamping both of them. As shown in FIG. 4, each lid 7, 8 is openable and closable with respect to the base 6 via a wedge shape opening and closing member 11. When assembling the optical connector 1, the lids 7, 8 are put in a slightly opened state, and the insert optical fiber 10a is inserted into the positioning groove 5a and butts to the internal optical fiber 2.

The appearance of the optical connector 1 shown in FIG. 1 and the configuration shown in FIG. 4 are common to both the present invention and the related art. In this kind of optical connector 1, generally, optical fibers with an orthogonal end face are butt connected via a refraction index adjusting agent in a butting portion of an internal optical fiber within a positioning groove and an insert optical fiber (FIGS. 4 to 6 of Patent Document 3, "Optical Connector"; Japanese Unexamined Patent Application, First Publication No. H08-201652).

Furthermore, in an optical attenuation element not in an optical connector, there is a configuration in which optical fibers are inserted from right and left into a micro throughhole opened in the center of a columnar shape ferrule, such that a gap is formed between tip end faces of the optical fibers, and the tip end faces of two optical fibers are obliquely ground (FIG. 1, claims 1 and 3, Paragraph [0024]. in Patent Document 4, "Optical Attenuation Element and Manufacturing Method Thereof"; Japanese Unexamined Patent Application, First Publication No. H05-100117).

In this optical attenuation element, reflected return light can be reduced by beveling the end face of the optical fiber opposite to the micro through-hole. The bevel angle of the optical fiber end face in the optical attenuation element is 8 degrees or more with respect to an orthogonal face of an optical axis.

As described above, generally, in an optical connector having a configuration as shown in FIG. 1 in which an internal optical fiber and an insert optical fiber are butt connected within a positioning groove, merely the optical fibers with an orthogonal end face are mutually butt connected via a refraction index adjusting agent. In this case, not only a suppression of the reflection from the refraction index adjusting agent is desirable, but also the achievement of a low reflecting connection. In addition, assembling of the optical connector will be simplified if the refraction index adjusting agent is no longer required.

In this case, under a constraint where a reflection suppression unit in a butting portion (ferrule end face) of the optical connectors is not suitable for a butting portion of the optical fibers within a positioning groove, it is desirable to realize a reflecting connection with a simple method without a complicated configuration.

For example, the method of Patent Document 1 etches the optical fiber, and is complicated.

Furthermore, the method of Patent Document 2 needs to be exactly set the retract amount d of an optical fiber end face with respect to the ferrule end face. However, the retract amount d of an optical fiber end face needs to be set exactly corresponding to the elasticity of the ferrule. Therefore, the method of Patent Document 2 is also complicated.

Furthermore, Patent Document 3 relates to an optical attenuator, and a gap is formed between the optical fibers. Therefore, Patent Document 3 differs from an optical connector in which the optical fibers are mutually butt connected.

Thereupon, a method is being focused on, in which a reflection in a butting portion is suppressed by beveling each end face of the internal optical fiber and the insert optical fiber in an optical connector having a configuration as shown in FIG. 1.

In this case, polishing an end face of an optical fiber to a beveled end face is also complicated. Therefore, cutting an end face of an optical fiber to a beveled end face is being focused.

However, when inserting an insert optical fiber 10a into a positioning groove 5a and butt connecting the insert optical fiber 10a to an internal optical fiber 2 during the assembly of an optical connector, since the tip ends of the beveled end faces of both the optical fibers 2, 10a are sharp, there is a possibility that the optical fibers 2, 10a will become chipped when butt connecting the insert optical fiber 10a to the internal optical fiber 2 within an invisible positioning groove. Since the optical connector with a chipped end face portion of an optical fiber is a defective product, it is important to avoid chipping the tip end portion while butting.

SUMMARY

The present invention has been made in consideration of the above circumstances and has an object to provide an optical connector which can realize a low reflecting connection in a butting portion, and there is no possibility that an optical fiber is chipped during assembly, in which an end face of an optical fiber is a beveled end face in an optical connector which butt connects an internal optical fiber and an insert optical fiber within a positioning groove.

The present invention employs the following to solve the above problems.

(1) An optical connector includes a ferrule to which an internal optical fiber is embedded and an end face grinding is performed; and a connection mechanism which extends to an opposite side of a connection end face of the ferrule, wherein the optical connector butt connects the internal optical fiber and an insert optical fiber which is inserted from the outside within a positioning groove provided at the connection mechanism; and a back end side of an end face of the internal optical fiber which butts to the insert optical fiber is made a beveled end face by cutting process.

(2) The internal optical fiber may be disposed to the positioning groove in a state where a sharp apex of the beveled end face of the internal optical fiber is oriented to a basal side of the positioning groove.

(3) A roundness may be formed at least at a periphery of the beveled end face of the internal optical fiber.

(4) A resin film with optical transparency and elasticity may be formed at the beveled end face of the internal optical fiber.

(5) The internal optical fiber and the insert optical fiber may be directly butt connected.

(6) The internal optical fiber and the insert optical fiber may be butt connected with a refraction index adjusting agent interposed therebetween.

(7) The connection mechanism may include a base which is integrated with the ferrule, and to which a positioning groove connects to an optical fiber hole of the ferrule is formed; a lid which is disposed opposite to the base; and a plate spring which elastically clamps both the base and the lid, wherein the lid may be divided to two lids of a lid for opening and closing a connecting portion that opens and closes a butt connection portion of an optical fiber, and a lid for opening and closing a cladding portion of an insert optical fiber that opens and closes a cladding portion of the insert optical fiber; wherein each lid may be openable and closable with respect to the base by a wedge shape opening and closing member.

According to the optical connector of the present invention, by beveling the back end side of the end face of the internal optical fiber, a low reflecting connection in a butting portion can be achieved, in which in the butting portion, an internal optical fiber in a positioning groove of a connection mechanism butts to an insert optical fiber with the same beveled end face.

In addition, an internal optical fiber is disposed to a positioning groove in a state where a sharp apex of the beveled end face of the internal optical fiber is oriented to a basal side of the positioning groove. Namely, a rotation angle (namely a position in a rotation direction, and an orientation of the beveled end face) of the internal optical fiber within the positioning groove is constant. Therefore, the possibility for generating a chip when inserting the insert optical fiber becomes low.

Namely, first of all, if the rotation angle of the internal optical fiber is constant, it is easy to butt both the optical fibers without a shift of rotation angles thereof, and the possibility for generating a chip becomes low, by inserting the insert optical fiber to the positioning groove in a rotation angle which is coordinated with the rotation angle of the internal optical fiber.

Second of all, if the sharp apex of the beveled end face of the internal optical fiber is positioned in a high position (an opposite side of the basal side of positioning groove), the end face of the insert optical fiber can easily hit the apex, thus the apex becomes easily chipped. In contrast, if the apex is positioned in a low position of the basal side of the positioning groove, the end face of the insert optical fiber is less likely to hit with the apex, thus it is hard to cause the chip.

Therefore, the defective product generated while assembling the optical connector can be reduced.

Furthermore, the beveled end face is formed by cutting process, thus a processing for obtaining the beveled end face becomes much easier when compared to the polishing processing.

The periphery of the beveled end face formed by cutting the optical fiber is a sharp angle. Therefore, while mutually butting the optical fibers with such a beveled end face, especially the sharp tip end portion at the periphery can be easily chipped while butting.

However, according to the optical connector of the present invention, since the roundness is formed at least at the periphery of the beveled end face of the internal optical fiber, the possibility for generating a chip while inserting the insert optical fiber becomes low.

Therefore, the defective product generated while assembling the optical connector can be reduced.

In addition, when the end face angles of the optical fibers which are butted to each other are different, even though the optical fibers are butted in one end side, a gap is generated in the other end side, thus a gap is generated between end faces of the optical fibers (between the end faces on optical fiber axis). However, if the roundness is formed at the periphery of the beveled end face, the gap between the end faces on the optical fiber axis becomes low, and an excellent butt connection portion can be formed.

The periphery of the beveled end face formed by cutting the optical fiber is a sharp angle. Therefore, while mutually butting the optical fibers with such a beveled end face, especially the sharp tip end portion at the periphery can be easily chipped while butting.

However, according to the optical connector of the present invention, since a resin film is formed at the beveled end face of the internal optical fiber, while inserting the insert optical fiber and butting to the internal optical fiber, the resin films are butted to each other, and thus the beveled end faces of the optical fibers are not directly butted. Therefore, the possibility for generating a chip becomes low.

Therefore, the defective product generated while assembling the optical connector can be reduced.

Furthermore, in a case where the end face angles of both the butting optical fiber are different, even if the beveled end faces are directly butted to each other, they are butted to each other at one end side of the faces, and a gap is generated in the other end side of the faces. Therefore, a gap is generated between the end faces of both the optical fibers (between end faces on the optical fiber axis). However, in an example of the present invention, the resin film is formed at the beveled end face, and the resin films with elasticity are directly butted to each other. Therefore, the actual gap between the end faces on the optical fiber axis (namely a gape between the surfaces of the resin film) becomes smaller or the gap goes away by the elastic compression deformation of the resin film while butting. Therefore, an excellent butt connection portion can be formed.

In a case where the elastic compression deformation becomes large and the gap goes away, a butt connection without a refraction index adjusting agent can be realized, thus the assembly of the optical connector is simplified.

DETAILED DESCRIPTION OF THE PREFERRED EMBODIMENTS

Hereunder is a description of an optical connector according to an aspect of the present invention with reference to the drawings.

EXAMPLE 1

Figure 1:
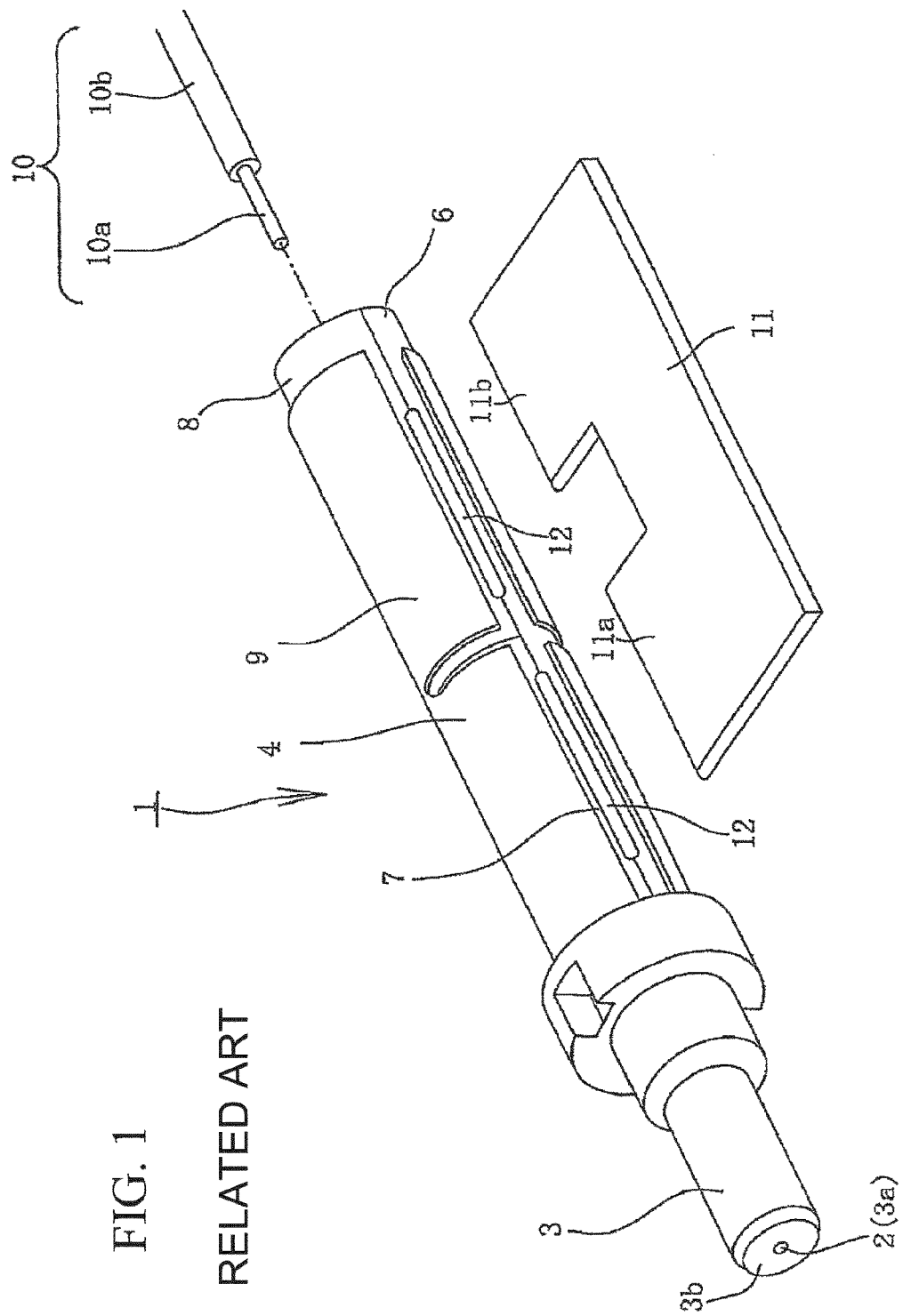
FIG. 1 is a perspective view showing an optical connector of Example 1 of the present invention together with an opening and closing member.
Figure 2:
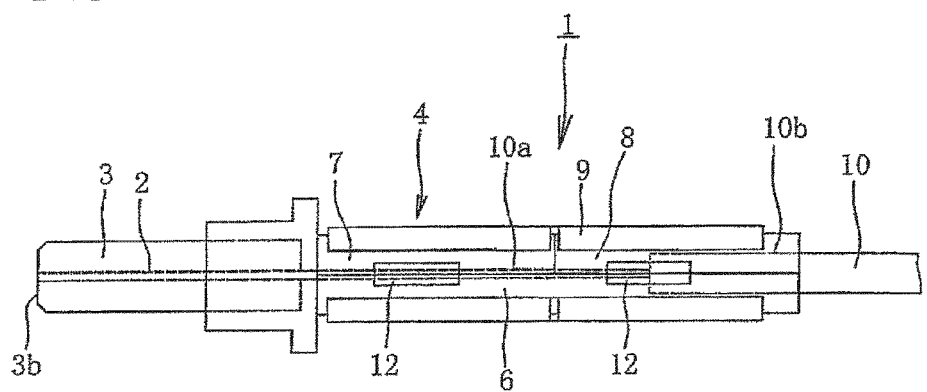
FIG. 2 is a side view of an optical connector shown in FIG. 1.
Figure 3:
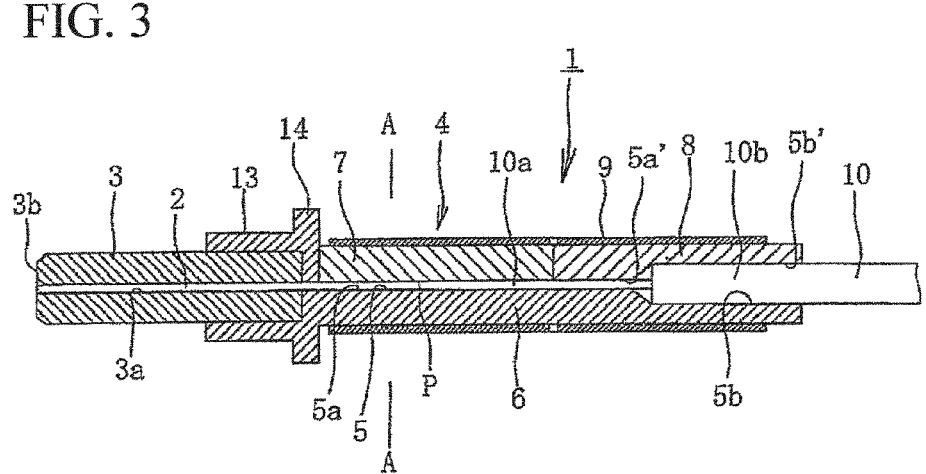
FIG. 3 is a vertical cross-sectional view of an optical connector shown in FIG. 1.

FIG. 1 is a perspective view showing an appearance of an optical connector 1 of Example 1 of the present invention together with an opening and closing member. FIG. 2 is a side view of the optical connector 1 shown in FIG. 1, and FIG. 3 is a vertical cross-sectional view thereof.

The optical connector 1 includes a ferrule 3 end face of which is ground and which has an internal optical fiber 2 (a bare optical fiber in which a cladding is eliminated), and a connection mechanism 4 that extends to an opposite side of an connection end face 3b of the ferrule 3. The internal optical fiber 2 butt connects to a bare optical fiber 10a of an insert optical fiber 10.

Both the internal optical fiber 2 and the bare optical fiber 10a of the insert optical fiber are silica-based fiber, and diameter thereof is 125 μm.

The connection mechanism 4 includes a base 6 in which a positioning groove 5 connected to an optical fiber hole 3a of the ferrule 3 is formed, a lid which is disposed opposite to the base 6, and a plate spring 9 elastically clamping both of them and the plate spring has, for example, a C-shape as shown in the drawing. That is, the connection mechanism 4 includes a base 6, a lid, and a plate spring 9 clamping the base 6 and the lid.

The base 6 is integrated with a brim shape flange portion 14a and a tubular ferrule fitting portion 13 to which the ferrule 3 is integrally fitted, and extends from the flange portion 14 to an opposite side of a connection end face 3b of the ferrule 3.

The positioning groove 5 of the base 6 includes a positioning groove 5a that directly connects to the optical fiber hole 3a and houses the optical fibers 2, 10a which are about to butt connect to each other, and a positioning groove 5b that houses a cladding portion 10b of an insert optical fiber 10.

The lid is divided to (composed of) two lids, namely a lid 7 for opening and closing a connecting portion that opens and closes a butt connecting portion P of an optical fiber, and a lid 8 for opening and closing a cladding portion of an insert optical fiber that opens and closes the cladding portion 10b of the insert optical fiber 10. A wedge type opening and closing member 11 is prepared, in which the opening and closing member 11 opens and closes each lid 7, 8 with respect to the base 6 resisting a reaction force of the plate spring 9.

The opening and closing member 11, as shown in FIG. 1, includes two wedge portions which are integrated, namely a wedge portion 11a for opening the lid 7 for opening and closing a connecting portion, and a wedge portion 11b for opening the lid 8 for opening and closing a cladding portion of an insert optical fiber.

Two recesses 12 for plugging an opening and closing member are formed between the base 6 and the lid 7 or between the base 6 and the lid 8, in which the two wedge portions 11a, 11b of the opening and closing member 11 are plugged into the recesses 12 respectively. The opening and closing member 11 is only used while assembling the optical connector.

The inner surface of the lid 7 for opening and closing a connecting portion is a flat surface. A positioning groove 5a' and a positioning groove 5b' are formed in the inner surface of the lid 8 for opening and closing a cladding portion of an insert optical fiber, in which the positioning groove 5a' houses a portion of the bare optical fiber 10a of the insert optical fiber 10, and the positioning groove 5b' houses the cladding portion 10b.

The end face of the optical connector 1 is ground in the factory in advance, and the optical connector 1 can also clamp the cladding portion 10b of the insert optical fiber 10. Therefore, the field assembly of the optical connector 1 is easy, thus the optical connector 1 is generally called a field assembly type optical connector.

Figure 4:
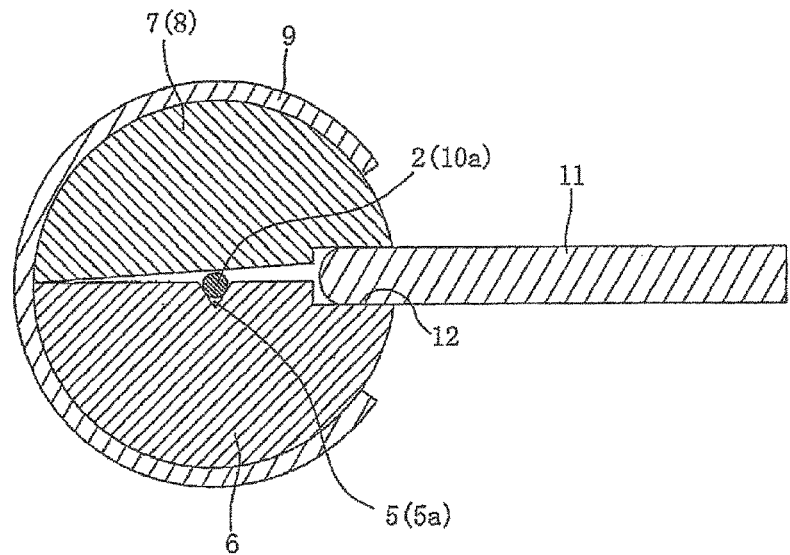
FIG. 4 is an enlarged transverse cross-sectional view showing a state where a connection mechanism of the optical connector is opened by an opening and closing member.

When assembling the optical connector 1, the two wedge portions 11a, 11b of the opening and closing member 11, as shown in FIG. 4, are plugged into the recesses 12 for plugging an opening and closing member formed between the base 6 and the lid 7 or between the base 6 and the lid 8, thus creating a state in which the lids 7, 8 are slightly opened.

In this state, the insert optical fiber 10 (tip end is a bare optical fiber) is inserted from outside, and the internal optical fiber 2 and the insert optical fiber 10 are butted.

A refraction index adjusting agent is filled between the end faces of both the optical fibers.

Next, the opening and closing member 11 is pulled out, and the butt connecting portion P of the optical fibers is held between the base 6 and the lids 7, 8 by the late spring 9, and the cladding portion 10b of the insert optical fiber 10 is held.

Figure 5:
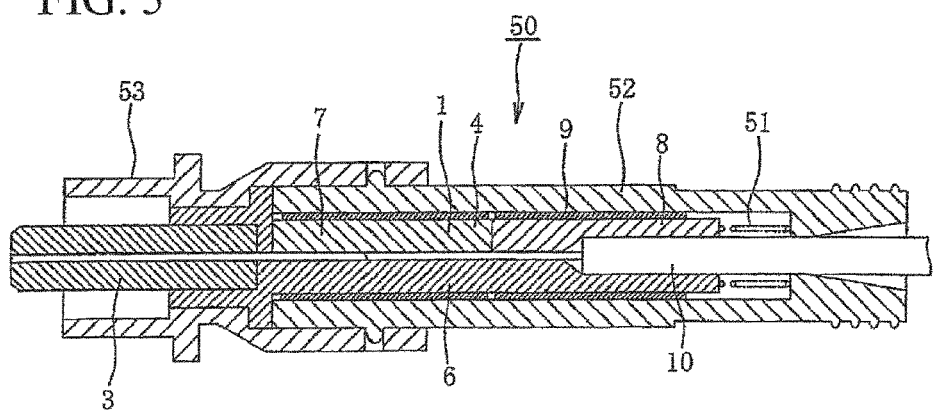
FIG. 5 is a vertical cross-sectional view in a usage state of the optical connector.

FIG. 5 shows an example of an optical connector device 50 in which the optical connector 1 is employed.

In the optical connector device 50, a spring 51 is provided at the connection mechanism 4 of the optical connector 1, in which the spring 51 touches the back end face of the connection mechanism 4 and urges the connection mechanism 4 forward a front side, a stop ring 52 is covered, and then a housing 53 is covered at a front portion of the ferrule 3 and the connection mechanism 4.

The configuration of the optical connector device 50 can be employed in a case in which the optical connector device is inserted into for example an optical connector adapter, and is connected to the other optical connector.

Figure 6A:
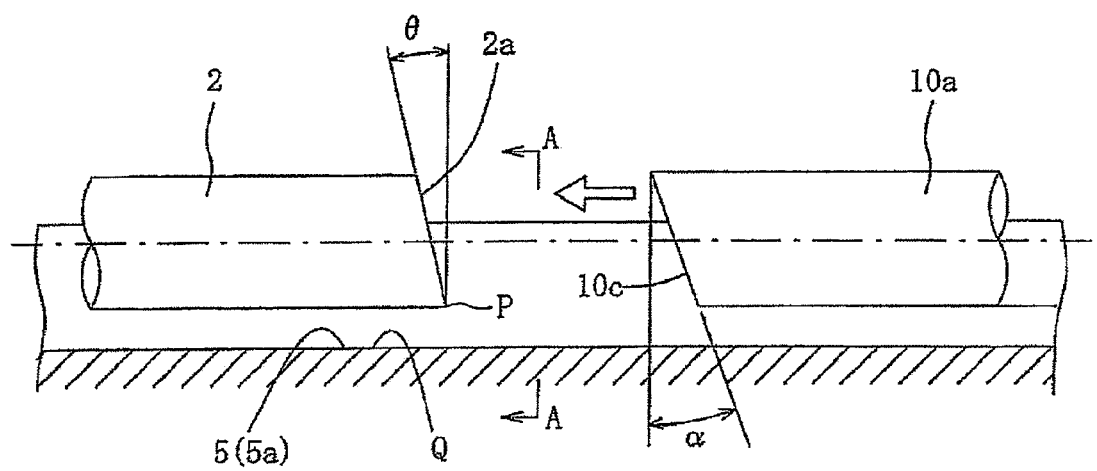
FIG. 6A is a view showing that an apex of a beveled end face of an internal optical fiber is oriented to a basal side of V-groove in the optical connector, and is an enlarged view showing an internal optical fiber within a positioning groove and an insert optical fiber which is about to butt to the internal optical fiber.
Figure 6B:
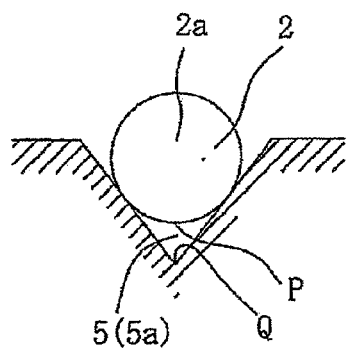
FIG. 6B is a sectional view along line A-A of FIG. 6A.

The above described configuration is a common configuration, in an Example of the present invention, as shown in FIG. 6A and FIG. 6B, a back end side of end face 2a, which butts to insert optical fiber 10 of the internal optical fiber 2 is formed as a beveled end face 2a by cutting (cutting process), and the internal optical fiber 2 is placed in the positioning groove 5a in a state in which a sharp apex P of the beveled end face 2a is oriented to a basal side (under side in FIG. 6A and FIG. 6B (the bottom is denoted with Q)) of the positioning groove 5a having a V-shape. The end face angle θ of the internal optical fiber 2, for example, may be approximately 5 to 8 degrees.

Furthermore, it is slight different with a case where cutting the optical fiber to a right angle, in a bevel cutting process for cutting the optical fiber to obtain a beveled end face, cutting is performed when a tensional force is applied to the optical fiber and then torsion is applied, and a desired end face angle is obtained by adjusting the degree of the tensional force and the torsion.

The end face of the insert optical fiber 10 which is butt connected to the internal optical fiber 2 is also formed to a beveled end face by the same cutting process. The end face angle α can be set to a range which is the same as or near to the end face angle of the internal optical fiber 2, for example 5 to 8 degrees.

In the above optical connector 1, a low reflecting connection can be achieved in a butting portion of the internal optical fiber 2 in a positioning groove 5a of connection mechanism 4 and the insert optical fiber 10 having the same beveled end face 10c, by making the back end side of the end face of the internal optical fiber 2 to be a beveled end face 2a.

When assembling the above optical connector 1, the lids 7, 8 are slightly opened, and the insert optical fiber 10 is inserted into the positioning groove 5a, and butt connected to the internal optical fiber 2.

In this case, since the end faces 2a, 10c of the optical fibers 2, 10a are beveled, the sharp apexes of the beveled end faces 2a, 10c can easily be chipped while butting.

However, in an Example of the present invention, since the internal optical fiber 2 is placed in the positioning groove 5a in a state where the sharp apex P of the beveled end face 2a is oriented to a basal side of the positioning groove 5a having a V-shape, namely, a rotation angle (namely a position in a rotation direction, or an orientation of the beveled end face) within the positioning groove 5a of the internal optical fiber 2 is constant. Therefore, the possibility that a chip is generated when inserting the insert optical fiber 10a becomes low.

First of all, if the rotation angle of the internal optical fiber 2 is constant, it is easy to butt both the optical fibers 2, 10a without shifting the rotation angles thereof, and the possibility for generating the chip becomes low, by inserting the insert optical fiber 10 to the positioning groove 5a in a rotation angle which is coordinated with the rotation angle of the internal optical fiber 2.

Figure 7:
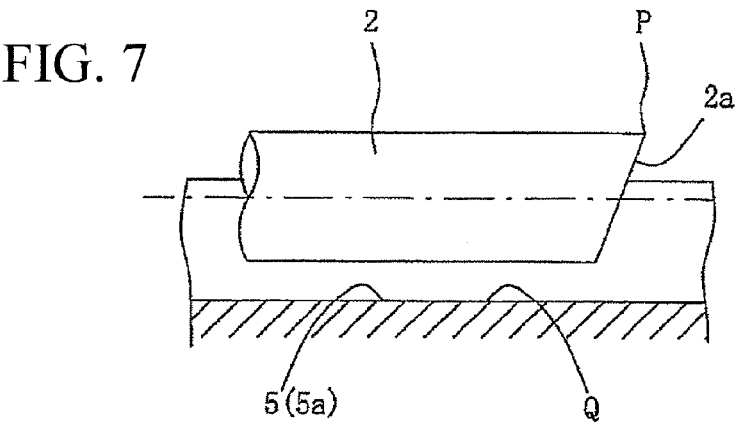
FIG. 7 is view for describing a state where an apex of a beveled end face of an internal optical fiber is oriented to an opposite side of a basal side of V-groove which differs from the Example of the present invention shown in FIG. 6A.
Figure 8A:
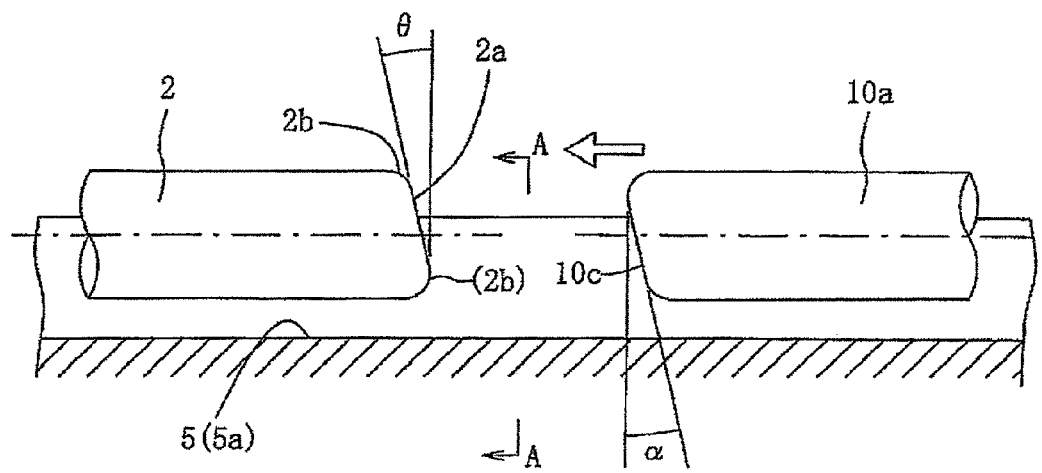
FIG. 8A is an enlarged view showing an internal optical fiber within a positioning groove and an insert optical fiber which is about to butt to the internal optical fiber in an optical connector of Example 2.
Figure 8B:
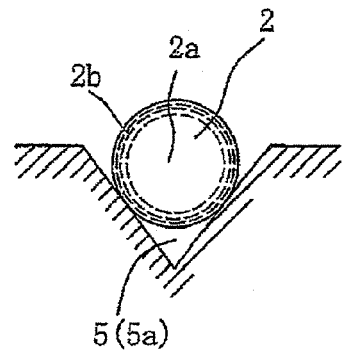
FIG. 8B is a sectional view along line A-A in FIG. 8A.

Second of all, if the sharp apex P of the beveled end face 2a of the internal optical fiber 2 is positioned in a high position (an opposite side of the basal side of V-shape) as shown in FIG. 7, the end face of the insert optical fiber easily connects to the apex P, thus the apex P can easily chip. In contrast, if the apex P is positioned in a low position of the basal side of V-shape groove 5a as shown in FIG. 6A and FIG. 6B, the end face of the insert optical fiber is difficult to contact with the apex P, thus it is difficult to cause a chip.

Therefore, the defective product while assembling the optical connector can be reduced.

Furthermore, the beveled end face is formed by cutting process, thus a processing for obtaining the beveled end face is much easier when compared to the polishing processing.

Furthermore, a V-shaped positioning groove is shown in Example 1. However, it is not limited to the shape, the other shape may also be used. For example, a U-shape or a "コ" characters shape may also be used.

EXAMPLE 2

Hereunder, an optical connector 1 according to Example 2 will be described with reference to FIG. 8A to FIG. 10B. Parts different from those of Example 1 will be described and description of common part will be omitted.

Example 2 includes the same configuration as shown in FIG. 1 to FIG. 5, and the description thereof is omitted here. In Example 2 of the present invention, as enlargely shown in FIG. 8A and FIG. 8B, a beveled end face 2a is obtained by cutting a back end side of an end face 2a, that butts to the insert optical fiber 10, of the internal optical fiber 2. A discharge treatment is applied to the beveled end face 2a of the internal optical fiber 2 using a fusion splicer, thus a roundness (a rounding portion) is formed at the beveled end face 2a, particularly at the periphery of the beveled end face 2a. A periphery portion with roundness is denoted by the symbol 2b. In the same manner, an insert optical fiber 10 with a beveled end face formed by a cutting and with roundness mainly at the periphery formed by a discharge treatment may also be used.

The end face angle θ of the beveled end face 2a of the internal optical fiber 2, for example may be 5 to 8 degrees. Furthermore, the end face angle α of the beveled end face 10c of the insert optical fiber 10 may be the same degree.

Furthermore, the distinction (border) between the core and the cladding of each of the optical fibers (bare optical fiber) 2, 10a is omitted in the drawings.

Figure 9A:
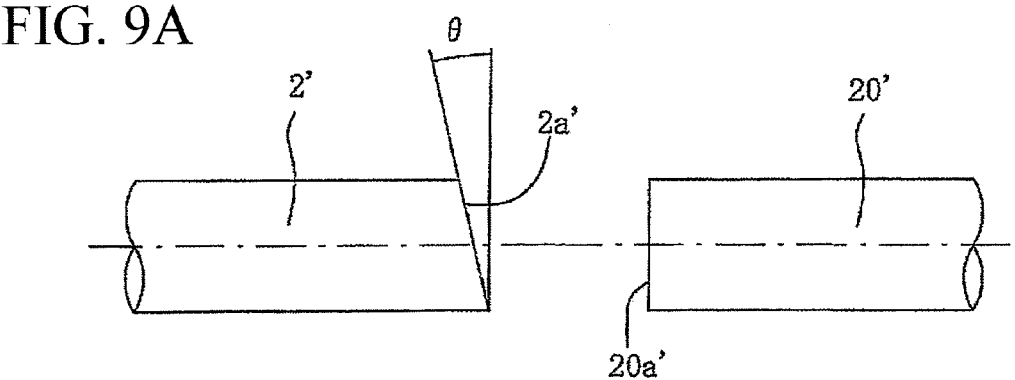
FIG. 9A is a view for describing how to prepare an internal optical fiber in an optical connector of the same Example and shows an internal optical fiber before discharge treatment and a dummy optical fiber for discharging which is opposite to the internal optical fiber.

Achievement of the beveled end face 2a with the roundness at periphery will be described with respect to the internal optical fiber 2. First of all, as shown in FIG. 9A, a beveled end face 2a' with an end face angle θ is obtained by cutting the internal optical fiber. An internal optical fiber before a discharge treatment is denoted by the symbol 2'.

A bevel cutting process for cutting the optical fiber to obtain a beveled end face slightly differs from a case where cutting the optical fiber to a right angle. In the bevel cutting process, the cutting is performed when a tensional force is applied and then torsion is applied to the optical fiber. A desired end face angle is obtained by adjusting the degree of the tensional force and the torsion.

Next, the internal optical fiber 2' with a beveled end face 2a' formed by a cutting process and a dummy optical fiber 20' for discharging are set to a fusion splicer, and a discharge treatment is performed.

The end face 20a' of the dummy optical fiber 20' is shown as a right angle in the drawing, but a small angle may be applied. The end face angle thereof is less important.

Generally, while performing fusion splicing, cleaning discharge for removing dust or the like at the fiber end face is performed in advance, and then discharge for the fusion splicing is performed. However, the discharge treatment in an example of the present invention can be performed only by, for example, cleaning discharge.

Figure 9B:
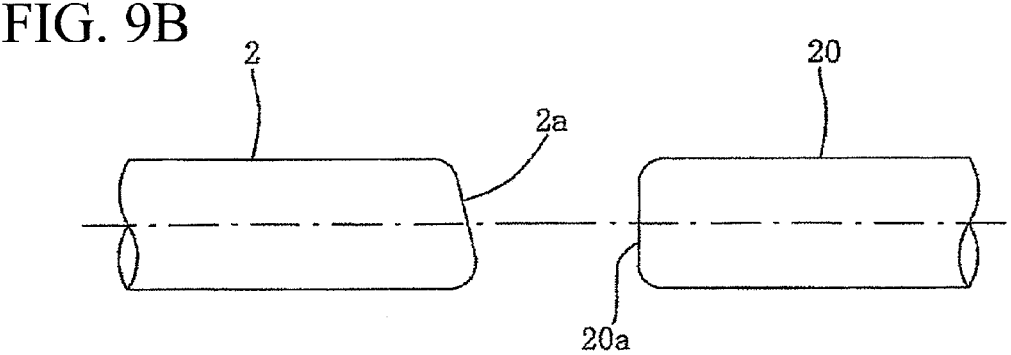
FIG. 9B is a view schematically showing an end face shape after discharge treatment in the same Example.

When the discharge treatment is performed, a beveled end face 2a with roundness mainly at the periphery is obtained, as an internal optical fiber 2 schematically shown in FIG. 9B. In this case, a roundness is also formed at a periphery of the end face 20a of the dummy optical fiber 20.

Figure 9C:
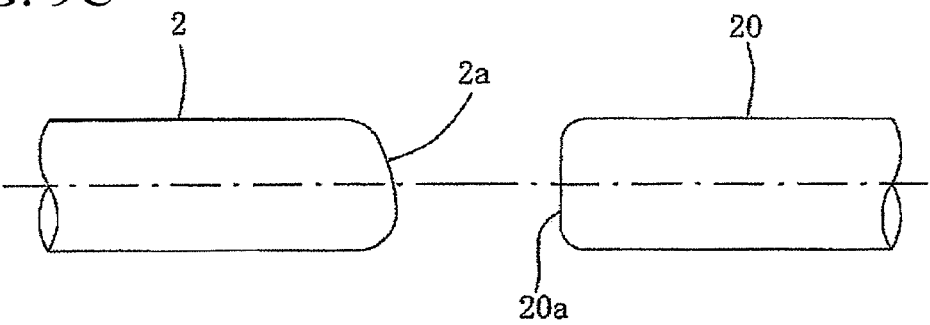
FIG. 9C is a view for describing an end face shape when an actual discharge treatment is performed in the same Example.

In an actual discharge treatment, as shown in FIG. 9C, the roundness is formed not only at a periphery but also at the whole end face, and a beveled end face 2a is obtained, in which an inside portion (center side portion) in the end face is formed as a curved surface such as a spherical surface or the like.

The condition for discharging can be set to an appropriate condition which can obtain a desired end face shape and the condition for discharging can be found under experiments. For example, with respect to a case where the period of the cleaning discharge at the fusion splicing, for example, is 50 mm seconds, the period of the cleaning discharge may be, for example, 700 mm seconds which is longer.

In the optical connector 1, by making the back side of end face of the internal optical fiber 2 to a beveled end face 2a, a low reflecting connection in a butting portion of the internal optical fiber 2 in a positioning groove 5a of the connection mechanism 4 and the insert optical fiber 10 with the same beveled end face 10c, can be achieved.

While assembling the above described optical connector 1, the lids 7, 8 are slightly opened, and the insert optical fiber 10 is inserted into the positioning groove 5a and butted to the internal optical fiber 2.

The periphery of the beveled end face formed by cutting the optical fiber is a sharp angle. Therefore, while mutually butting the optical fibers with beveled end faces, especially the sharp tip end portion at the periphery can easily be chipped while butting.

However, in the above described optical connector 1, since the beveled end face 2a of the internal optical fiber 2 is subject to a discharge treatment using a fusion splicer, the roundness is formed mainly at the periphery of the beveled end face, thus the possibility that the chip is generated when inserting the insert optical fiber 10a becomes low.

Therefore, the defective product generated while assembling the optical connector can be reduced.

Furthermore, the shape of the beveled end face depends on the cutting process, and the processing for achieving a beveled end face is much easier when compared to a polishing processing.

Figure 10A:
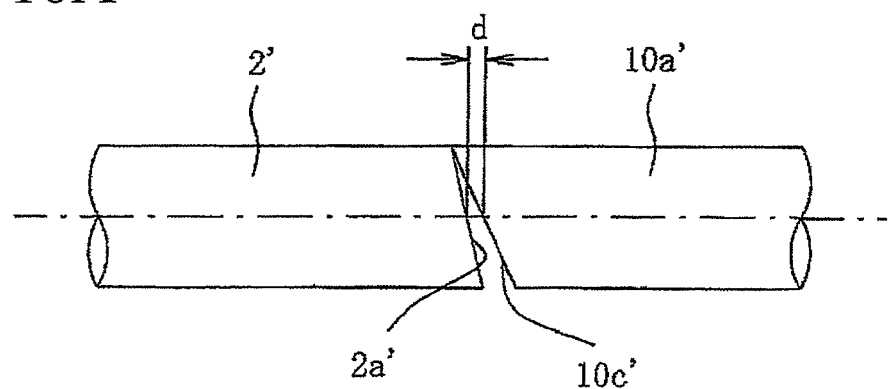
FIG. 10A is a view for describing a gap d between end faces on an optical fiber axis while butt connecting optical fibers without a roundness in a periphery of a beveled end face.

As shown in FIG. 10A, while mutually butting both optical fibers 2', 10a' with beveled end faces 2a', 10c' in which only a cutting process is performed and the discharge treatment is not performed, as shown in the drawing, when the end face angles of both the butted optical fibers 2', 10a' are mutually different, even if the optical fibers are mutually butted at one end side (upper end side in the drawing) thereof, a gap is generated in the other end side (under end side in drawing). A gap d is generated between the end faces 2a', 10c' of both the optical fibers 2', 10a' (between the end faces on an optical fiber axis).

Figure 10B:
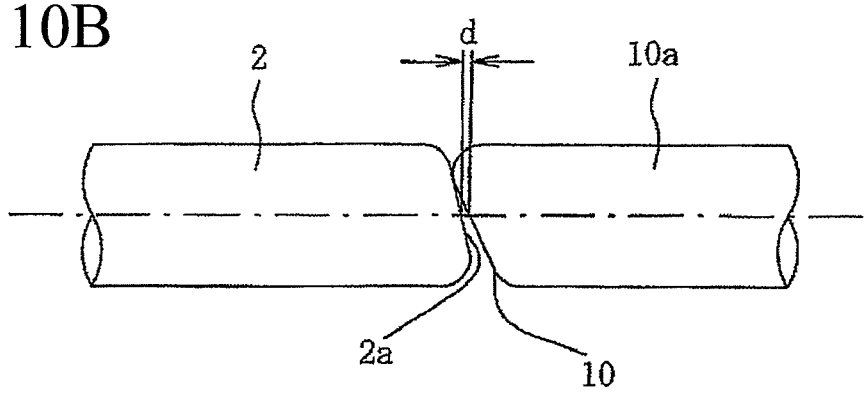
FIG. 10B is a view for describing a situation in which a gap d between end faces on an optical fiber axis becomes small by rounding a periphery of a beveled end face.

However, as shown in FIG. 10B, if a roundness is formed at a periphery of the beveled end faces 2a, 10c, the gap d between the end faces 2a, 10c on the optical fiber axis becomes small, and an excellent butt connection portion can be formed.

In the present Example 2, the roundness is formed by a discharge treatment. However, it is not limited by this. The roundness can also be formed by a laser irradiation treatment or a grinding treatment.

EXAMPLE 3

Hereunder, an optical connector of Example 3 will be described with reference to FIG. 11A to FIG. 12C. Parts different from those of the Example 1 will be described and descriptions of common parts will be omitted.

In Example 1, the refraction index adjusting agent is filled between the end faces of both the optical fibers. However, in the present Example 3, as described later, there are cases where the refraction index adjusting agent is filled between the end faces of both the optical fibers and where the refraction index adjusting agent is not filled between the end faces of both the optical fibers.

Figure 11A:
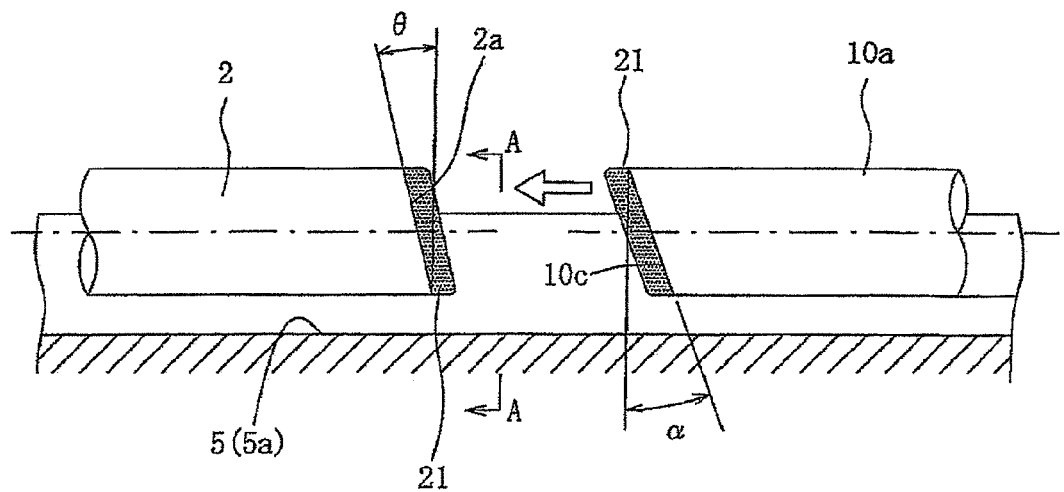
FIG. 11A is an enlarged view showing an internal optical fiber within a positioning groove in an optical connector of Example 3, and an insert optical fiber which is about to butt to the internal optical fiber.
Figure 11B:
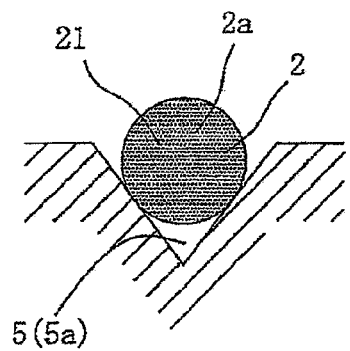
FIG. 11B is a sectional view along line A-A in FIG. 11A.

In the present Example 3, the same configuration as shown in FIG. 1 to FIG. 5 is employed. The description thereof is omitted here. In Example 3 of the present invention, as shown in FIG. 11A and FIG. 11B, the back end side of end face 2a of the internal optical fiber 2 which butts to the bare optical fiber 10a of the insert optical fiber 10 is made a beveled end face 2a by a cutting process, and a resin film 21 with a film thickness of 15 to 30 μm is formed at the beveled end face 2a. The resin film 21 is made from silicon or acrylate resin has optical transparency and elasticity. Epoxy resin and the like can be used as the component of the resin film 21, besides the silicon or acrylate resin. There is no limitation on the forming method of the resin film 21 made from the silicon or acrylate resin at the beveled end face 2a. For example, the resin film 21 can be formed by a method of merely applying to the beveled end face 2a.

The bevel cutting process for cutting the optical fiber to obtain the beveled end face differs from a case where cutting the optical fiber to a right angle. In bevel cutting process, cutting is performed when a tensional force is applied and then torsion is applied to the optical fiber, and a desired end face angle is obtained by adjusting the degree of the tensional force and the torsion.

The end face angle θ of the beveled end face 2a of the internal optical fiber 2 may be, for example, 5 to 8 degrees. In addition, the end face angle α of the beveled end face 10c of the insert optical fiber 10 may be set to the same degree.

In addition, the distinction (border) of the core and the clad of each optical fiber (bare optical fiber) 2, 10a is omitted in the drawings.

In the above optical connector 1, by making the back side of the end face of the internal optical fiber 2 a beveled end face 2a, a low reflecting connection in a butting portion of the internal optical fiber 2 in the positioning groove 5a of the connection mechanism 4 and the insert optical fiber 10 with the same beveled end face 10c can be achieved.

While assembling the above optical connector 1, the lids 7, 8 are slightly opened, and the insert optical fiber 10 is inserted into the positioning groove 5a and is butted to the internal optical fiber 2.

Since the periphery of the beveled end face formed by cutting the optical fiber becomes a sharp angle, while mutually butting the optical fibers having this beveled end face, the sharp tip end portion of periphery can easily be chipped when butting.

However, in the above optical connector 1, since a resin film 21 with a film thickness of 15 to 30 μm which is made from silicon or acrylate resin is formed at the beveled end face 2a of the internal optical fiber 2, while inserting the insert optical fiber 10 and butting to the internal optical fiber 2, the resin films 21 are mutually butted, the beveled end faces 2a, 10c of the optical fibers are not directly butted. Therefore, the possibility for generating a chip becomes low.

Therefore, the generation of the defective product while assembling the optical connector becomes small.

In addition, since the beveled end face is formed by the cutting process, the processing for obtaining the beveled end face becomes simpler when compare to a case where beveled end face is formed by polishing processing.

Figure 12A:
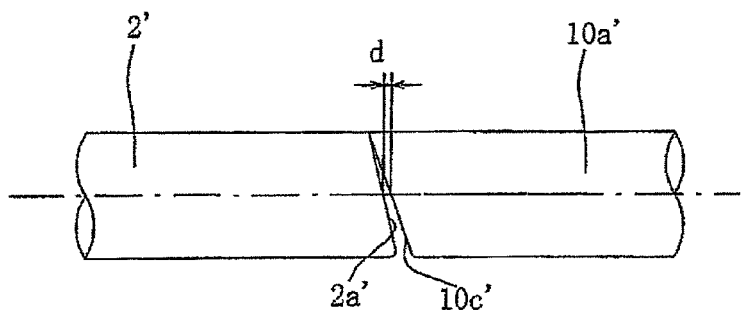
FIG. 12A is a view for describing a situation in which beveled end faces of an internal optical fiber are directly butted.

Furthermore, in a case where the end face angles of both the butted optical fibers are different, even if the beveled end faces 2a, 10c are directly butted to each other as shown in FIG. 12A, they are butted to each other at one end side (upper end side in the drawing), and a gap is generated in the other end side (under end side in the drawing). Therefore, a gap d is generated between the end faces 2a, 10c of both the optical fibers 2, 10a (between end faces on the optical fiber axis).

Figure 12B:
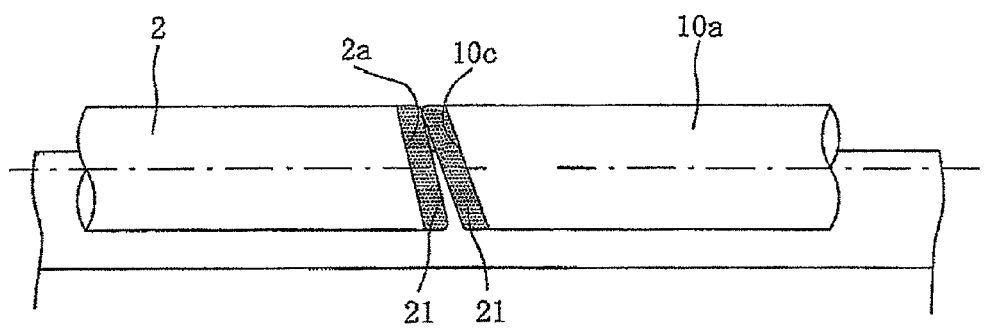
FIG. 12B is a view showing a situation in which resin films are connected without a pressure by forming a resin film at a beveled end face of an internal optical fiber.

However, in Example 3 of the present invention, the resin films 21 are formed at the beveled end face, and the resin films 21 with elasticity are directly butted to each other. FIG. 12B shows a state in which the surfaces of the resin films of both the optical fibers 2, 10a are mutually connected without a suppress strength.

Figure 12C:
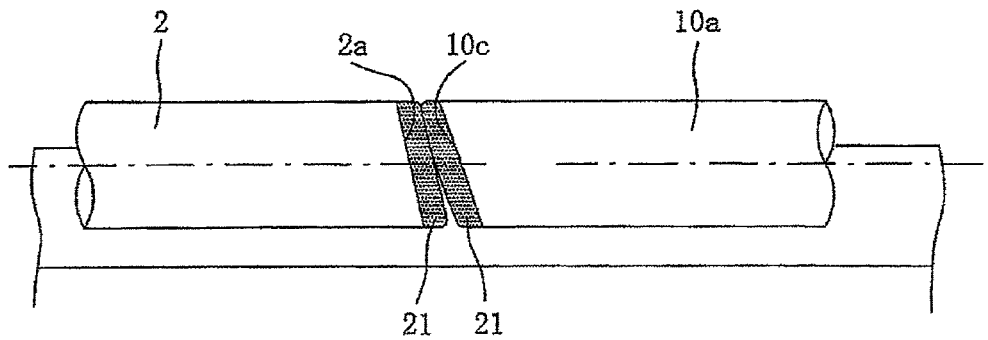
FIG. 12C is a view for describing a situation in which a actual gap between end faces on an optical fiber axis becomes small due to an elastic compression deformation, by forming a resin film at a beveled end face of an internal optical fiber.

When both the optical fibers 2, 10a are butted under a certain suppress strength, as shown in FIG. 12C, the actual gap (namely the gap between the surfaces of the resin films) between the end faces on the optical fiber axis becomes small or the gap goes away by the elastic compression deformation of the resin film 21. Therefore, an excellent butt connection portion can be formed.

When the elastic compression deformation of the resin film 21 becomes large and the gap goes away, a butt connection without the refraction index adjusting agent can be realized, thus the assembling of the optical connector simplified.

EXAMPLE 4

Parts different from those of the Examples 1 to 3 will be described, and description of common parts will be omitted in Example 4.

In Example 4, the same as in Example 1, the end face of the internal optical fiber 2 is made a beveled end face 2a by a cutting process, and the end face of the insert optical fiber 10 is also made a beveled end face 10c.

Then, the same as in Example 2, a roundness is formed at least at a periphery of the beveled end face by performing a discharge treatment to the beveled end face 2a of the internal optical fiber 2 using a fusion splicer. In the same manner, a roundness is formed at least at the periphery of the beveled end face 10c of the bare optical fiber 10a. The roundness can also be formed by laser irradiating or grinding.

Then, the same as in Example 3, resin film made from silicon or acrylate resin is formed at the beveled end faces 2a, 10c. Thereby, the same effects as those in Examples 1 to 3 can be obtained.

INDUSTRIAL APPLICABILITY

According to the embodiments of the present invention, an optical connector with no possibility for generating a chip of the optical fiber while assembling and with a low reflecting connection in the butting portion can be achieved, by making the end face of the optical fiber to be a beveled end face.

What is claimed is:
1. An optical connector comprising:
    a ferrule to which an internal optical fiber is embedded and an end face grinding is performed; and
    a connection mechanism which extends to an opposite side of a connection end face of the ferrule, wherein the optical connector butt connects the internal optical fiber and an insert optical fiber which is inserted from the outside within a positioning groove provided at the connection mechanism; and wherein a back end side of an end face of the internal optical fiber which butts to the insert optical fiber is made a beveled end face by a cutting process, a resin film with optical transparency and elasticity is formed at the beveled end face of the internal optical fiber, and the internal optical fiber and the insert optical fiber are butt connected with the resin film interposed therebetween.

2. The optical connector according to claim 1, wherein the internal optical fiber is disposed to the positioning groove in a state where a sharp apex of the beveled end face of the internal optical fiber is oriented to a basal side of the positioning groove.

3. The optical connector according to claim 1, wherein a roundness is formed at least at a periphery of the beveled end face of the internal optical fiber by a discharge treatment.

4. The optical connector according claim 1, wherein the internal optical fiber and the insert optical fiber are butt connected with a refraction index adjusting agent interposed therebetween.

5. The optical connector according to claim 1, wherein the connection mechanism comprises:

a base which is integrated with the ferrule, and to which a positioning groove connects to an optical fiber hole of the ferrule is formed;

a lid which is disposed opposite to the base; and a plate spring which elastically clamps both the base and the lid, wherein the lid is divided to two lids of a lid for opening and closing a connecting portion that opens and closes a butt connection portion of an optical fiber, and a lid for opening and closing a cladding portion of an insert optical fiber that opens and closes a cladding portion of the insert optical fiber;

wherein each lid is openable and closable with respect to the base by a wedge shape opening and closing member.

6. The optical connector according to claim 1, wherein the resin film has a film thickness of 15 to 30 µm.

* * * * *